United States Patent Office 3,354,046
Patented Nov. 21, 1967

3,354,046
METHOD OF TREATING STARCH SLURRIES TO IMPROVE THEIR FILTERABILITY
Robert V. MacAllister and Edward K. Crosby, Clinton, and Robert E. Lanphere, Camanche, Iowa, assignors to Standard Brands Incorporated, New York, N.Y., a corporation of Delaware
No Drawing. Filed Dec. 30, 1964, Ser. No. 422,435
8 Claims. (Cl. 195—7)

This invention relates to a method of treating starch slurries containing partially swollen and/or damaged granules to improve the filterability of the slurries.

In the commercial production of unmodified starch and modified starches the major portion of the water is removed from a starch slurry by vacuum filtration to produce a wet starch filter cake. The cake is then removed from the filter and dried in a current of hot air. Often filtration is the limiting factor in production and the filtration rate must be such as to allow operation of the driers at maximum capacity.

In the processing of granular starch slurries some of the starch granules may be ruptured and swollen or otherwise converted into particles which reduce the filterability of the slurries. This is particularly true when native starch is subjected to modification in slurry form, for instance by treatment with acid, alkali or hypochlorite. The resulting decrease in filtration rate makes it impossible to deliver sufficient starch cake to the driers to keep them operating at full capacity. In the case of some slurries of modified starch, the filter cloth may be clogged so completely in a relatively short time that only a very thin layer of starch can be picked up by the filter.

We have discovered that these difficulties can be avoided and the filterability of a starch slurry containing damaged or swollen starch granules, dextrins or other starch products which filter poorly, can be greatly improved by converting the damaged material in the slurry into a more easily filterable form by treatment with a starch hydrolyzing enzyme. The starch hydrolyzing enzyme may be, for instance, an alpha amylase preparation derived from *B. subtilis*. Glucamylases, malt amylases or soybean beta amylase are also effective. Small amounts of the enzyme are sufficient. The amount is usually that required to convert substantially all of the damaged material into a more easily filterable form. While larger quantities may be used, they are not recommended for reasons of economy. Also excessive quantities may result in an appreciable decrease in the viscosity of the product, which may not be desired, unless care is taken to inactivate the excess. The excess can be inactivated by conventional procedures, for instance, treatment with hydrogen peroxide, addition of copper salts or changing the pH, before filtration and drying.

Factors other than enzyme concentration can significantly affect the activity of the enzyme on the material which is to be converted. These factors are well known to those skilled in the art. The slurry pH and the temperature should of course be such as not to inactivate the enzyme. The pH should preferably be adjusted to the range of optimum activity of the enzyme. For alpha amylase from *B. subtilis* the pH may range between about 4.0 and 8.0 and preferably between about 6.0 and 7.0. The temperature may be in the range from about room temperature to slightly below the gelatinization temperature of the starch and advantageously from about 100 to 130° F. for unmodified and acid modified starches but not over about 115° F. for oxidized starches. The duration of the treatment should be sufficient to allow the enzyme to solubilize substantially all of the damaged starch granules in the slurry or at least enough of them to improve the filterability of the slurry.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

*Example 1*

Acid modified corn starch with a fluidity of 90 was prepared by treating native corn starch in water slurry with hydrochloric acid at a temperature below the gelatinization temperature of the starch. This slurry contained some damaged or swollen starch granules. The slurry was adjusted to have 28.43% dry substance starch, a temperature of 120° F. and a pH of 5.0. A part of the batch was filtered and dried in the conventional manner in equipment operating continuously. A total of 34,300 pounds of dried product containing about 12.0% moisture was obtained in 24 hours. This represents a filtration rate which is only one-half that of a native starch slurry of comparable solids concentration.

To another portion of the batch there was added 0.075%, based on the dry substance starch, of an enzyme preparation derived from *B. subtilis* having an alpha amylase concentration of 10,000 liquefons per gram. The slurry was maintained at 120° F. for 30 minutes and then filtered and dried in the same manner as the first part of the batch using the same equipment operating under the same conditions. A total of 49,700 pounds of dried product containing about 11.8% moisture was obtained in 24 hours. Thus this portion of the batch was filtered nearly 50% faster than the first portion.

The quantity of enzyme used in this example had no appreciable effect on the fluidity of the product. No further improvement in the filtration rate resulted when the quantity of the enzyme was increased above 0.075%.

*Example 2*

Native corn starch was oxidized by treatment in water slurry with alkaline hypochlorite. The resulting slurry contained some damaged or swollen starch granules. The slurry was adjusted to have 28.43% dry substance starch, a temperature of 100° F. and a pH of 6.0. One liter of this slurry was filtered directly while another liter was filtered after addition of an alpha amylase enzyme preparation followed by agitation at 100° F. for 30 minutes. The filtration was carried out on a No. 5 Buchner funnel with 14 inches of vacuum. The enzyme preparation was the same as that described in Example 1.

Filtration time in the case of the slurry treated with enzyme was 2 minutes, 21 seconds and 4 minutes, 45 seconds in the case of the slurry which was not treated with enzyme.

Our process is applicable to the treatment of slurries of all kinds of starches including native, modified and derivatized starches, so long as they are in the granule form and the slurry contains damaged or swollen granules which decrease its filterability.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A method of producing starch which comprises treating an aqueous slurry of starch granules containing some swollen or damaged starch granules with a starch hydrolyzing enzyme in an amount and under conditions effective to water solubilize substantially all of said swollen or damaged granules without effecting an appreciable decrease in the viscosity of the slurry and thereby improving the filterability of the slurry, filtering the slurry to obtain starch granules and then drying the filtered starch granules.

2. A method of producing modified starch as defined in claim 1, wherein the enzyme is an alpha amylase preparation.

3. A method of producing modified starch as defined in claim 1, wherein the starch is acid modified.

4. A method of producing modified starch as defined in claim 1, wherein the starch is an oxidized starch.

5. A method of producing modified starch as defined in claim 2, wherein the pH of the slurry is in a range of from about 4 to about 8.

6. A method of producing modified starch as defined in claim 5, wherein the pH of the slurry is in a range of from about 6 to about 7.

7. A method of producing modified starch as defined in claim 2, wherein the starch is acid modified, the pH of the slurry is in the range from about 6 to about 7, and the temperature of the slurry is from about 100 to about 130° F.

8. A method of producing modified starch as defined in claim 2, wherein the starch is an oxidized starch, the pH of the slurry is in a range from about 6 to about 7, and the temperature of the slurry is below 115° F.

References Cited
UNITED STATES PATENTS

| | | | |
|---|---|---|---|
| 2,965,520 | 12/1960 | Snyder et al. | 195—11 X |
| 3,039,935 | 6/1962 | Rentshler et al. | 195—11 |
| 3,067,066 | 12/1962 | Ehrenthal et al. | 195—11 X |
| 3,150,993 | 9/1964 | Hanson et al. | 195—31 X |
| 3,197,338 | 7/1965 | Hurst et al. | 195—31 X |

OTHER REFERENCES

Kerr: Chemistry and Industry of Starch, 2nd ed., Academic Press Inc., New York, pp. 444 and 445 (1950).

ALVIN E. TANENHOLTZ, *Primary Examiner.*